(12) United States Patent
Zhou et al.

(10) Patent No.: US 11,582,771 B2
(45) Date of Patent: Feb. 14, 2023

(54) FAST BEAM SELECTION IN WIRELESS COMMUNICATION

(71) Applicant: QUALCOMM Incorporated, San Diego, CA (US)

(72) Inventors: Yan Zhou, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 16/877,074

(22) Filed: May 18, 2020

(65) Prior Publication Data

US 2020/0396749 A1 Dec. 17, 2020

Related U.S. Application Data

(60) Provisional application No. 62/861,533, filed on Jun. 14, 2019.

(51) Int. Cl.
*H04W 72/12* (2009.01)
*H04W 72/04* (2009.01)

(52) U.S. Cl.
CPC ......... *H04W 72/12* (2013.01); *H04W 72/042* (2013.01); *H04W 72/046* (2013.01)

(58) Field of Classification Search
CPC .. H04W 72/12; H04W 72/042; H04W 72/046
See application file for complete search history.

(56) References Cited

U.S. PATENT DOCUMENTS

| | | | |
|---|---|---|---|
| 2016/0135143 A1* | 5/2016 | Won | H04W 72/005 370/312 |
| 2016/0323075 A1* | 11/2016 | Jeong | H04L 5/0032 |
| 2017/0155494 A1* | 6/2017 | Tavildar | H04L 5/0057 |
| 2018/0091262 A1 | 3/2018 | Jung et al. | |
| 2018/0123648 A1* | 5/2018 | Nagaraja | H04B 7/043 |
| 2018/0219606 A1* | 8/2018 | Ng | H04L 1/06 |

FOREIGN PATENT DOCUMENTS

| | | |
|---|---|---|
| EP | 3573269 A1 | 11/2019 |
| WO | 2018135867 A1 | 7/2018 |

OTHER PUBLICATIONS

International Search Report and Written Opinion—PCT/US2020/033572—ISAEPO—dated Jul. 28, 2020.

* cited by examiner

*Primary Examiner* — Angel T Brockman
(74) *Attorney, Agent, or Firm* — Loza & Loza, LLP

(57) ABSTRACT

A base station retransmits data to a user equipment (UE) using a fast beam selection process before the retransmission. The UE transmits an uplink feedback in a beam sweep manner to facilitate fast beam selection in retransmission. The base station can measure the beam sweep patterns from the UE to decide the best beam for retransmission. The UE can send a negative acknowledgment (NACK) or a reference signal in a beam sweep manner to facilitate beam selection at the base station for retransmission.

30 Claims, 11 Drawing Sheets

FAST BEAM SELECTION IN WIRELESS COMMUNICATION

PRIORITY CLAIM

This application claims priority to and the benefit of provisional patent application No. 62/861,533 filed in the United States Patent and Trademark Office on Jun. 14, 2019, the entire content of which is incorporated herein by reference as if fully set forth below in its entirety and for all applicable purposes.

TECHNICAL FIELD

The technology discussed below generally relates to wireless communication systems, and more particularly, to beamforming and beam tracking techniques in wireless communication.

INTRODUCTION

In a fifth-generation (5G) wireless communication network, also known as New Radio (NR), higher frequency bands (e.g., above 6 GHz or millimeter wave) may be used to provide a larger bandwidth for various wireless communication applications including low latency applications. This spectrum can provide a wide bandwidth for high-speed wireless communications such as the latest 5G NR networks that can support various data intensive services (e.g., high definition video streaming and multimedia content and services). Because a high frequency (e.g., millimeter wave (mmW)) transmission can be highly directional, a transmitting device can transmit a signal using several beams of different directions to communicate with a receiver.

Beamforming techniques can boost the signals in the high frequency bands, at the expense of more complicated processing in order to achieve highly directional transmission and reception. Therefore, a base station needs to monitor and perform beamforming adjustments to ensure coverage in a communication system using higher frequency bands. In low latency applications, however, there is less time available for selecting and adjusting a beam.

BRIEF SUMMARY OF SOME EMBODIMENTS

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure are directed to a scheduling entity and a user equipment (UE) that perform downlink (DL) data retransmission using a fast beam selection process before the retransmission. The UE transmits an uplink feedback in a beam sweep manner to facilitate fast beam selection by the scheduling entity in DL data retransmission. The scheduling entity measures a plurality of beams included in the beam sweep pattern from the UE to determine the beam to use for the retransmission. The UE can transmit a negative acknowledgment (NACK) or a reference signal in a beam sweep manner to facilitate beam selection at the scheduling entity for the retransmission.

One aspect of the present disclosure provides a method of wireless communication at a scheduling entity. The scheduling entity transmits, to a scheduled entity (e.g., UE), downlink (DL) data using a first beam. The scheduling entity further receives, from the scheduled entity, one or more beams of a plurality of beams transmitted by the scheduled entity in a beam sweep pattern. The scheduling entity further selects a second beam based on the respective beam qualities of the one or more beams. The scheduling entity further retransmits the DL data using the second beam.

Another aspect of the present disclosure provides a method of wireless communication at a scheduled entity. The scheduled entity monitors a downlink (DL) data channel using a first beam for receiving DL data from a scheduling entity. The scheduled entity further transmits, to the scheduling entity, a plurality of beams in a beam sweep pattern to facilitate beam selection for a retransmission of the DL data. The scheduled entity further receives, from the scheduling entity, the retransmission of the DL data using a second beam of the plurality of beams.

Another aspect of the present disclosure provides a scheduling entity for wireless communication. The scheduling entity includes a communication interface configured to communicate with a scheduled entity, a memory, and a processor operatively coupled with the communication interface and the memory. The processor and the memory are configured to transmit, to the scheduled entity, downlink (DL) data using a first beam. The processor and the memory are further configured to receive, from the scheduled entity, one or more beams transmitted by the scheduled entity in a beam sweep pattern. The processor and the memory are further configured to select a second beam based on the respective beam qualities of the one or more beams. The processor and the memory are further configured to retransmit the DL data using the second beam.

Another aspect of the present disclosure provides a scheduled entity for wireless communication. The scheduled entity includes a communication interface configured to communicate with a scheduling entity, a memory, and a processor operatively coupled to the communication interface and the memory. The processor and the memory are configured to monitor a downlink (DL) data channel using a first beam for receiving DL data from a scheduling entity. The processor and the memory are further configured to transmit, to the scheduling entity, a plurality of beams in a beam sweep pattern to facilitate beam selection for a retransmission of the DL data. The processor and the memory are further configured to receive, from the scheduling entity, the retransmission of the DL data using a second beam selected from the plurality of beams.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments

DETAILED DESCRIPTION

Figure 1:
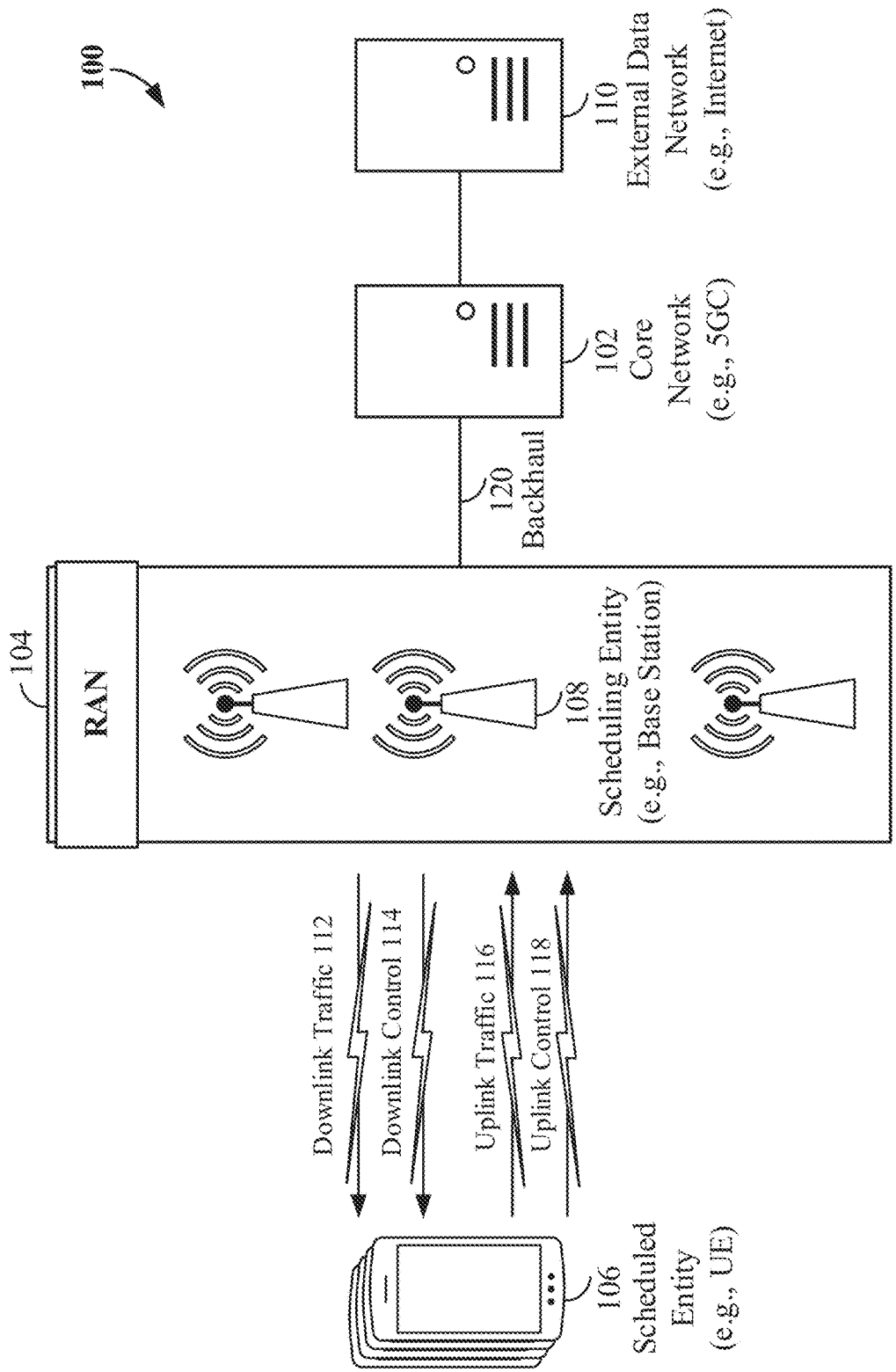
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, it should be understood that the term "sub-6 GHz" if used herein by way of example may represent all or part of FR1 for 5G NR. Further, unless specifically stated otherwise, it should be understood that the term "millimeter wave" as used herein by way of example may represent all or part of FR2 for 5G NR and/or all or part of a 30 GHz-300 GHz waveband. It should also be understood that the terms "sub-6 GHz" and "millimeter wave," are intended to represent modifications to such example frequency bands that may occur do to author/entity decisions regarding wireless communications, e.g., as presented by example herein.

It should be understood that the above examples are not necessarily intended to limit claimed subject matter. For example, unless specifically recited, claimed subject matter relating to wireless communications is not necessarily intended to be limited to any particular author/entity defined frequency band, or the like.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In a fifth generation (5G) New Radio (NR) wireless communication network, communication devices can utilize beamforming techniques to improve signal coverage and/or range, in particular, when higher frequency bands (e.g., above 6 GHz) are used. In some examples, an NR network can use millimeter wave (mmW) for wireless communication. However, a wireless transmission using mmW frequency has higher attenuation or pathloss than lower frequencies (e.g., sub-6 GHz frequencies). A transmitting device can overcome the attenuation or pathloss using a directional transmission technique such as beamforming that transmits the signal in one or more highly focused beams (e.g., a beam pattern) to overcome propagation losses.

Aspects of the present disclosure provide apparatuses, a system, and methods for facilitating fast beam selection in a retransmission of a signal based on a feedback beam sweep. A beam sweep includes a plurality of beams in different directions. A beam is a directional signal transmission or reception. In some aspects of the disclosure, a user equipment (UE) transmits an uplink feedback in a beam sweep manner to facilitate fast beam selection in retransmission. In some examples, the uplink feedback may include a negative acknowledgment (NACK) or a reference signal transmitted in a beam sweep pattern. The base station can measure the beam sweep pattern from the UE to decide the best beam for retransmission. In some aspects of the disclosure, the UE can send a reference signal in a beam sweep manner to facilitate beam selection at the base station for the retransmission of a signal.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet and the like.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a scheduling entity, or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106). In some aspects of the disclosure, the UL and/or DL transmissions may use beamforming techniques that will be described in more detail in this disclosure.

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources (e.g., time, frequency, and spatial resources) allocated by the scheduling entity 108. Base stations 108 are not the only entities that may function as scheduling entities. That is, in some examples, a UE may function as a scheduling entity, scheduling resources for one or more scheduled entities (e.g., one or more other UEs).

The scheduling entity 108 may dynamically allocate resources to the UEs at each transmission time interval (e.g., slot or subframe). This kind of resource allocation is referred to as dynamic scheduling because the scheduling entity may change resource allocation in each transmission time interval (TTI). A UE monitors at each transmission time interval for a dynamic resource grant, for example, in a physical downlink control channel (PDCCH), in order to find a possible allocation (downlink and uplink) it is assigned to. The scheduling entity 108 may also allocate resources to the UEs using semi-persistent scheduling (SPS). For example, the scheduling entity can allocate uplink/downlink resources for initial hybrid automatic repeat request (HARQ) transmissions persistently. When required, retransmissions may be explicitly signaled using L1 and/or L2 control signals. Because HARQ retransmissions are scheduled, this kind of operation is referred to as semi-persistent scheduling (SPS), i.e., resources are allocated to the user equipment on a semi-persistent basis (semi-persistent resource allocation). SPS may be configured and re-configured using radio resource control (RRC) messages at any time, for example, RRC information element (e.g., SPS-Config) in an RRC connection reconfiguration message. SPS can be configured in the uplink, downlink, or in both directions. The scheduling entity can explicitly activate SPS in order for the UE to use SPS grants/assignments. That is, the scheduling entity first configures the UE with SPS and then activates the same, for example, using downlink control information (DCI).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
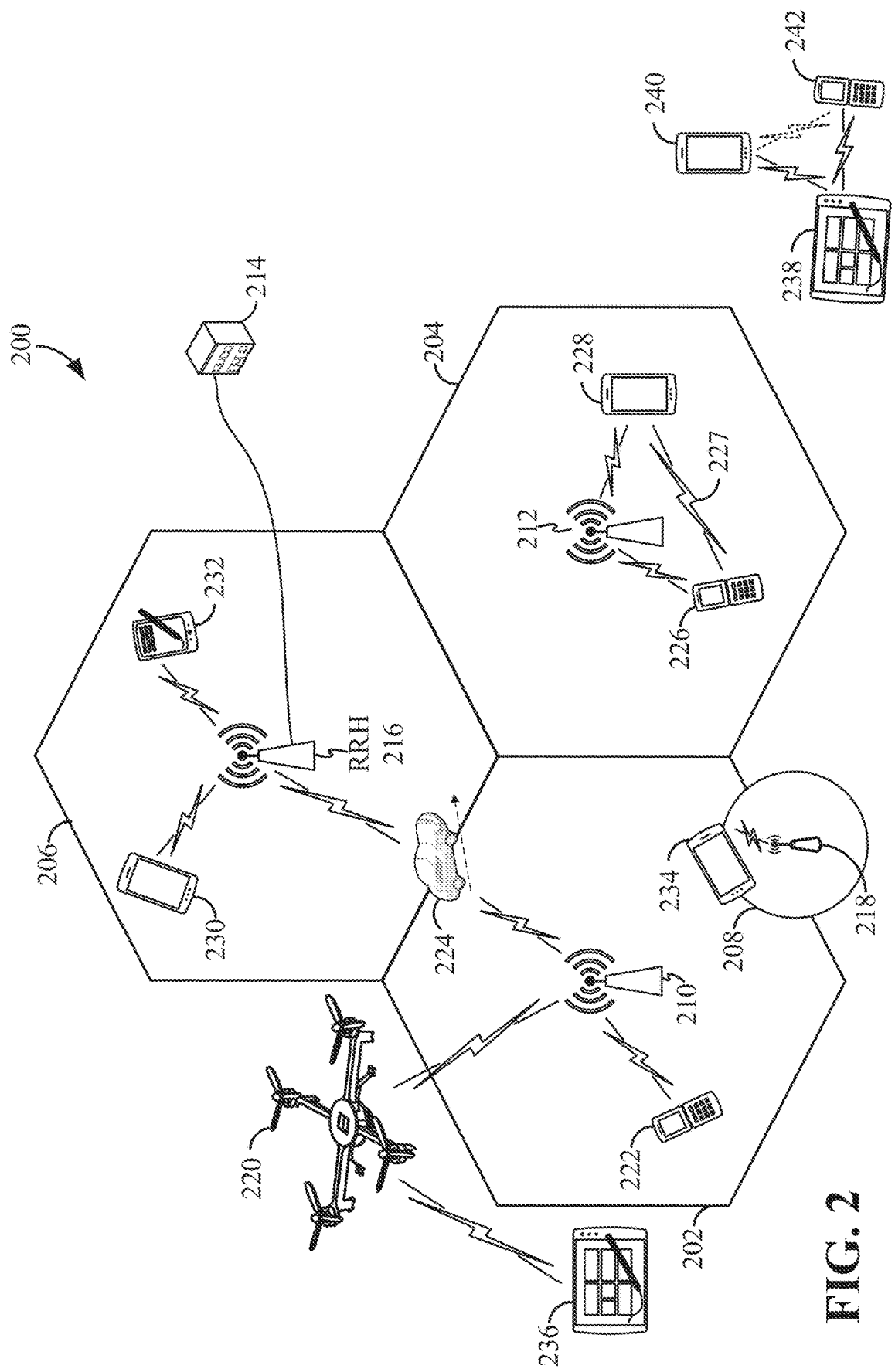
FIG. 2 is a conceptual illustration of an example of a radio access network according to some aspects of the disclosure.

FIG. 2 is a conceptual illustration of an example of a radio access network 200. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network (e.g., core network 102) for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if the signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In some examples, user data may be coded using quasi-cyclic low-density parity check (LDPC) with two different base graphs: one base graph is used for large code blocks and/or high code rates, while the other base graph is used otherwise. Control information and the physical broadcast channel (PBCH) may be coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from a base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
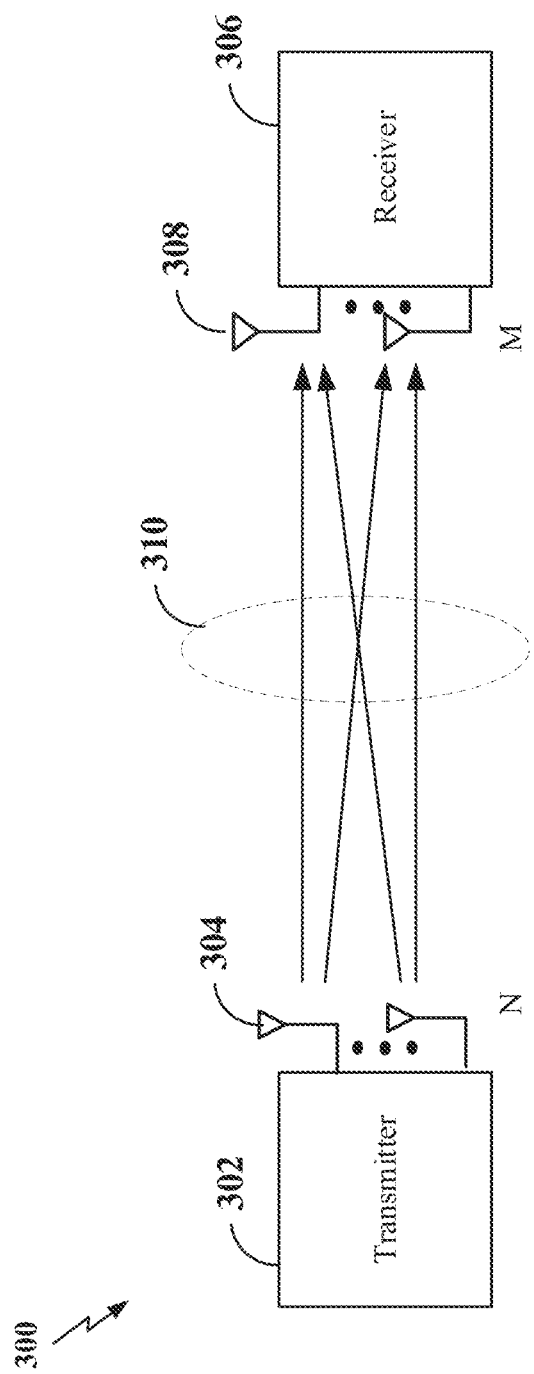
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting beamforming and MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described hereinbelow. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 4, an expanded view of an exemplary subframe 402 (e.g., DL subframe) is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple numbers of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example. In some examples, the RB 408 may occupy more than one OFDM symbol duration.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH or PUCCH), and the data region 414 may carry data channels (e.g., a physical downlink shared channel (PDSCH) or a physical uplink shared channel (PUSCH)). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
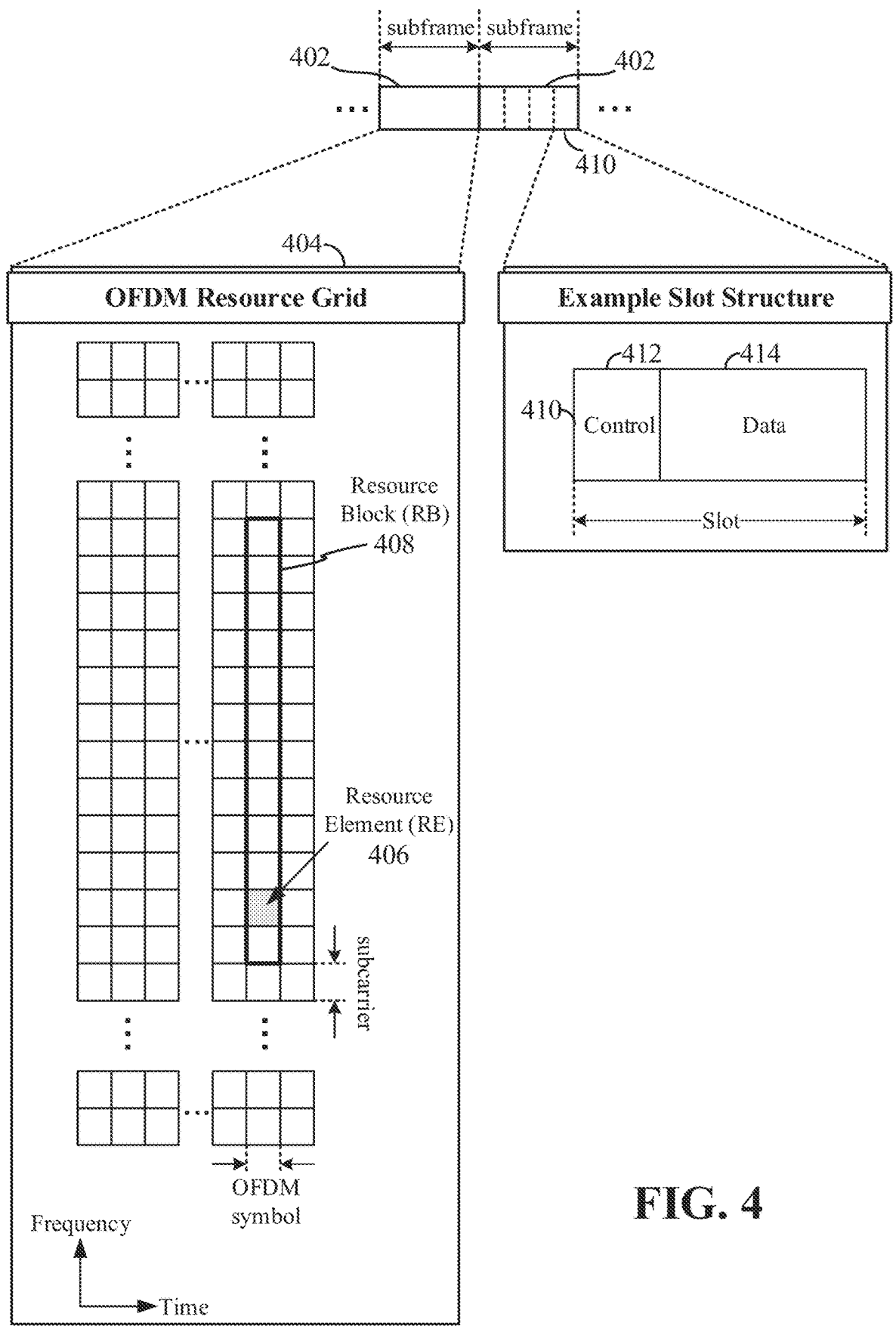
FIG. 4 is a schematic illustration of an organization of wireless resources in an air interface utilizing orthogonal frequency divisional multiplexing (OFDM) according to some aspects of the disclosure.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a PDCCH, etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc. The PDCCH may carry downlink control information (DCI) for one or more UEs in a cell. This can include, but is not limited to, power control commands, scheduling information, a grant, and/or an assignment of REs for DL and UL transmissions.

In 5G NR, the PDCCH may be transmitted in a configurable control resource set (CORSET). A CORSET includes a set of RBs organized in RE groups (REGs). Each REG may consist of 12 REs of one OFDM symbol in one RB.

In an UL transmission, a transmitting device (e.g., a scheduled entity 106) may utilize one or more REs 406 to carry UL control information 118 (UCI), for example, in the control region 412. The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above and illustrated in FIGS. 1, 2, and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
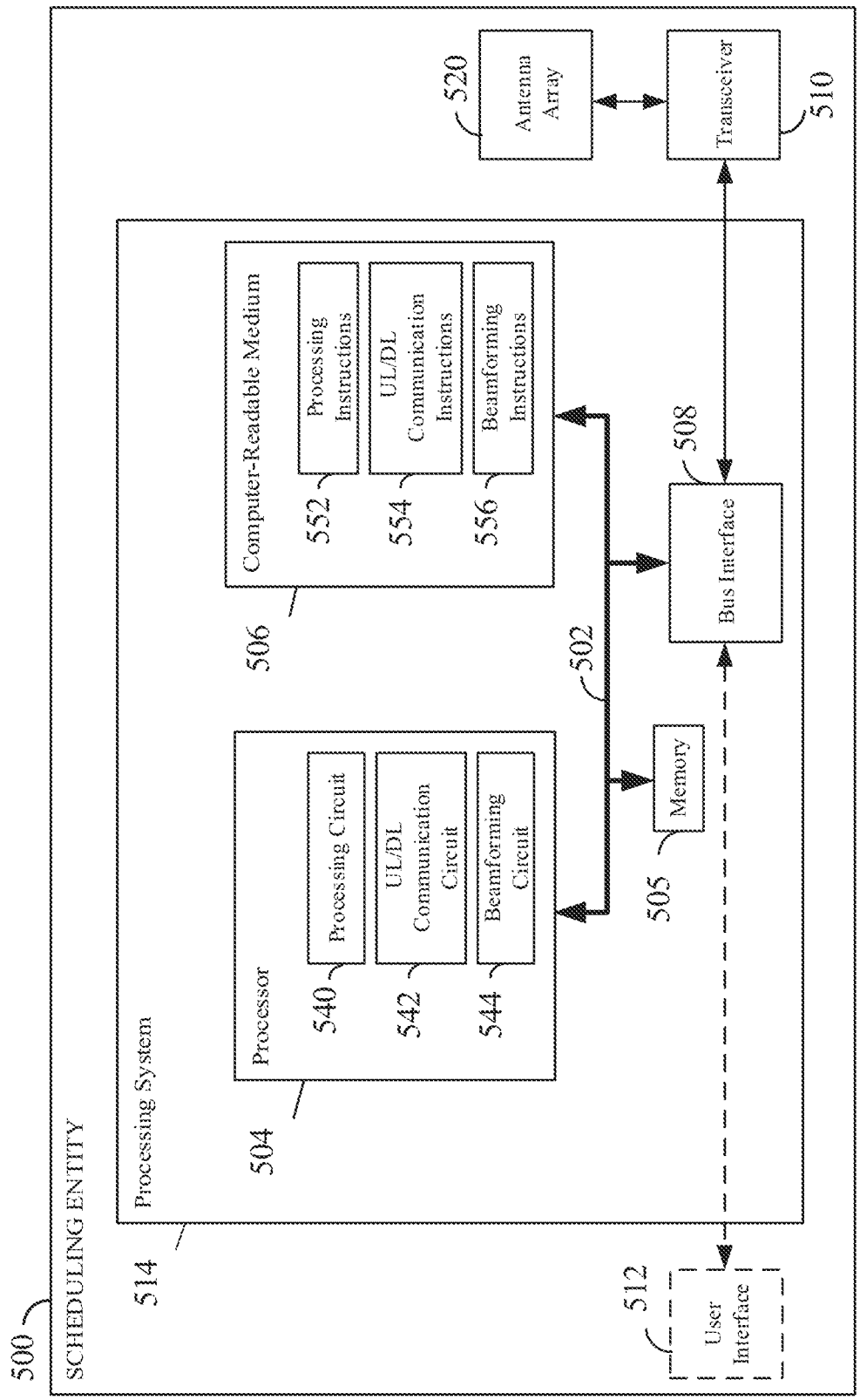
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 500 employing a processing system 514. For example, the scheduling entity 500 may be a base station as illustrated in any one or more of FIGS. 1, 2, and/or 3.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions and processes described herein. That is, the processor 504, as utilized in a scheduling entity 500, may be used to implement any one or more of the processes and procedures described and illustrated in FIGS. 7-11.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. The transceiver 510 may include multiple antennas or an antenna array for performing beamforming communication. Depending upon the nature of the apparatus, a user interface 512 (e.g., keypad, display, speaker, microphone, joystick, touchscreen) may also be provided. Of course, such a user interface 512 is optional, and may be omitted in some examples, such as a base station.

In some aspects of the disclosure, the processor 504 may include circuitry configured for various functions, including, for example, signal retransmission using fast beam selection techniques based on a feedback beam sweep. For example, the circuitry may be configured to implement one or more of the functions described below in relation to FIGS. 7-11.

In one aspect of the disclosure, the processor 504 may include a processing circuit 540, an UUDL communication circuit 542, and a beamforming circuit 544. The processing circuit 540 may be configured to perform various data and signal processing, logic, and control functions for wireless communication between the scheduling entity and other devices (e.g., a UE). The processing circuit 540 may be configured to utilize other circuits and components of the scheduling entity to perform various functions described in this disclosure. The UL/DL communication circuit 542 may be configured to perform various functions used in UL and DL communication with one or more scheduled entities. For example, the UL/DL communication circuit 542 may be configured to prepare data (e.g., encoding, scrambling, modulation, resource mapping, multiplexing, interleaving, converting, etc.) for DL transmission using the transceiver 510 via an antenna array 520. The antenna array 520 includes a plurality of antennas that can be used for transmitting and receiving signals using beamforming. In one example, the UL/DL communication circuit 542 may also be configured to process UL data (e.g., decoding, descrambling, demodulation, demultiplexing, resource demapping, deinterleaving, converting, etc.) received by the transceiver 510 via the antenna array 520. The beamforming circuit 544 may be configured to perform various beamforming related functions, for example, beam direction control functions, beam measurement functions, beam selection functions, beam sweeping functions, beam pattern activation and deactivation, etc.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include software configured for various functions, including, for example, data retransmission using fast beam selection based on a feedback beam sweep. For example, the software may be configured to implement one or more of the functions described in relation to FIGS. 7-11.

In one aspect of the disclosure, the software may include processing instructions 552, UL/DL communication instructions 554, and beamforming instructions 556. The processor 504 can execute the processing instructions 552 to perform various data processing, logic, and control functions for performing wireless communication between the scheduling entity and other devices. The processor 504 can execute the processing instructions 552 to utilize other circuits and components to perform various functions and algorithms described in this disclosure. The processor 504 can execute the UL/DL communication instructions 554 to perform various functions used in UL and DL communication with one or more scheduled entities (e.g., a UE). For example, the processor 504 can execute the UL/DL communication instructions 554 to prepare data (e.g., encoding, scrambling, modulation, resource mapping, multiplexing, interleaving, converting, etc.) for DL transmission using the transceiver 510 via the antenna array 520. For example, the processor 504 can execute the UL/DL communication instructions 554 to process UL data (e.g., decoding, descrambling, demodulation, demultiplexing, resource demapping, deinterleaving, converting, etc.) received by the transceiver 510 via the antenna array 520. The processor 504 can execute the beamforming instructions 556 to perform various beamforming related functions, for example, beam direction control functions, beam measurement functions, beam selection functions, beam sweeping functions, beam activation and deactivation, etc.

Figure 6:
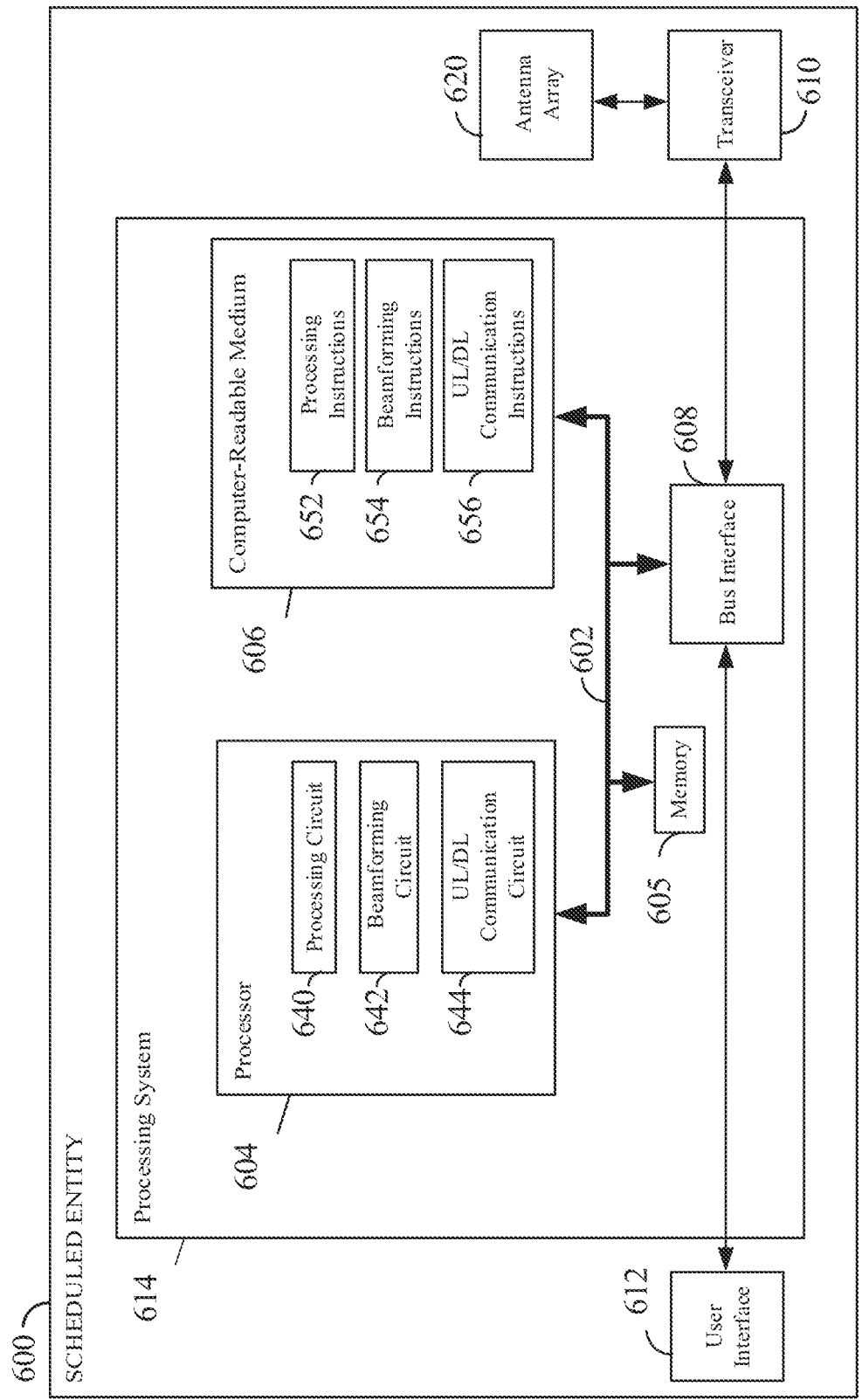
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1, 2, and/or 3.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. The transceiver 610 may include multiple antennas or an antenna array for beamforming communication. That is, the processor 604, as utilized in a scheduled entity 600, may be used to implement any one or more of the processes and functions described and illustrated in FIGS. 7-11.

In some aspects of the disclosure, the processor 604 may include circuitry configured for various functions, including, for example, data and signal retransmission using fast beam selection based on a feedback beam sweep. For example, the circuitry may include a processing circuit 640, a beamforming circuit 642, and an UL/DL communication circuit 644. The processing circuit 640 may be configured to perform various data and signal processing, logic, and control functions for performing wireless communication between the scheduled entity and a scheduling entity. The processing circuit 640 may be configured to utilize other circuits and components of the scheduled entity to perform various functions described in this disclosure. The UL/DL communication circuit 644 may be configured to perform various functions used in UL and DL communication with a scheduling entity. For example, the UL/DL communication circuit 644 may be configured to prepare data or signal (e.g., encoding, scrambling, modulation, resource mapping, multiplexing, interleaving, converting, etc.) for UL transmission using the transceiver 610 via an antenna array 620. The antenna array 620 includes a plurality of antennas that can be used for UL and/or DL communication using beamforming. For example, the UL/DL communication circuit 644 may also be configured to process DL data or signal (e.g., decoding, descrambling, demodulation, demultiplexing, resource demapping, deinterleaving, converting, etc.) received by the transceiver 610 via the antenna array 620. The beamforming circuit 642 may be configured to perform various beamforming related functions, for example, beam direction control functions, beam measurement functions, beam selection functions, beam sweeping functions, beam activation and deactivation, etc.

In one or more examples, the computer-readable storage medium 606 may include software configured for various functions, including, for example, data retransmission using fast beam selection based on a feedback beam sweep. For example, the software may be configured to implement one or more of the functions described in relation to FIGS. 7-11. In one aspect of the disclosure, the software may include processing instructions 652, beamforming instructions 654, and UL/DL communication instructions 656. The processor 604 can execute the processing instructions 652 to perform various data and signal processing, logic, and control functions for performing wireless communication between the scheduled entity and a scheduling entity. The processor 604 can execute the processing instructions 652 to utilize other circuits and components to perform various functions described in this disclosure. The processor 604 can execute the UL/DL communication instructions 656 to perform various functions used in UL and DL communication with the scheduling entity. For example, the processor 604 can execute the UL/DL communication instructions 656 to prepare data or signal (e.g., encoding, scrambling, modulation, resource mapping, multiplexing, interleaving, converting, etc.) for UL transmission using the transceiver 610 and antenna array 620. For example, the processor 604 can execute the UL/DL communication instructions 656 to process DL data or signal (e.g., decoding, descrambling, demodulation, demultiplexing, resource demapping, deinterleaving, converting, etc.) received by the transceiver 610 via the antenna array 620. The processor 604 can execute the beamforming instructions 654 to perform various beamforming related functions, for example, beam direction control functions, beam measurement functions, beam selection functions, beam sweeping functions, beam activation and deactivation, etc.

Figure 7:
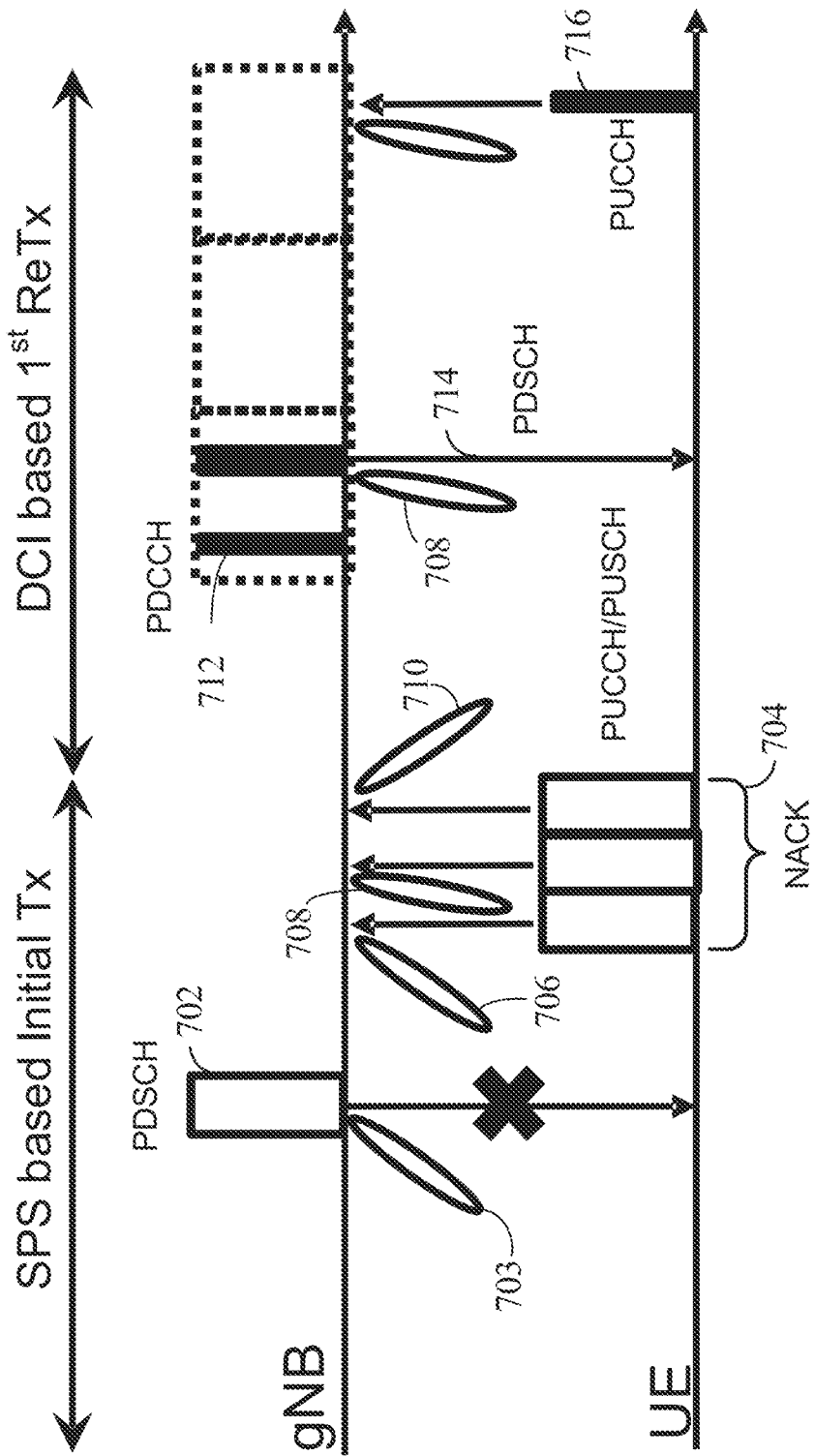
FIG. 7 is a diagram conceptually illustrating a data retransmission process using fast beam selection based on a feedback beam sweep according to some aspects of the disclosure.

FIG. 7 is a diagram conceptually illustrating a data retransmission process using fast beam selection based on a feedback beam sweep in accordance with some aspects of the present disclosure. In some examples, the process may be carried out by a scheduling entity 500 (e.g., gNB) illustrated in FIG. 5 and a scheduled entity 600 (e.g., UE) illustrated in FIG. 6. In a semi-persistent scheduling (SPS) based initial transmission (Tx), the scheduling entity transmits DL data in a downlink data channel (e.g., PDSCH 702) using certain SPS resources. When beamforming is configured for DL transmission, the scheduling entity may transmit the DL data using one or more predetermined beams (e.g., beam 703).

In some scenarios, when the scheduled entity is unable to receive and/or decode the PDSCH 702, the scheduled entity transmits a HARQ feedback to notify the scheduling entity. For example, the feedback may be a negative acknowledgment (e.g., NACK 704) transmitted in an uplink (UL) channel (e.g., PUCCH or PUSCH). In response to the NACK, the scheduling entity may retransmit the DL data (PDSCH) in a HARQ retransmission. Due to the mobility and/or changing channel condition between the scheduling entity and scheduled entity, the beam 703 used for the initial transmission of the PDSCH may no longer be the best beam for communication between the scheduling entity and scheduled entity.

In some aspects of the disclosure, the scheduled entity may send the UL feedback (e.g., NACK) in a beam sweep manner or pattern to facilitate beam selection for retransmission. The scheduling entity may pre-configure the feedback beam sweep resources and corresponding beam sweep pattern by RRC signaling and/or MAC-CE (MAC Control Element). For example, the scheduling entity may pre-configure the scheduled entity to use a predetermined beam sweep pattern and UL resources for transmitting NACK feedback. In some examples, the scheduling entity may configure the UL beam sweep resources with a repetition pattern such that each beam may be repeated for X times (e.g., X is a predetermined positive integer). In some examples, the UL beam sweep resources may be shared by multiple scheduled entities (e.g., UEs) to reduce communication resource overhead. In this case, the scheduling entity can schedule only the scheduled entity sending NACK to use the shared UL beam sweep resources to avoid conflict among the devices.

Based on UL measurements of the different beams, the scheduling entity can select the beam for the retransmission of the DL data. For example, in an exemplary beam sweep pattern, the scheduled entity transmits a first beam 706, a second beam 708, and a third beam 710 in an UL channel (e.g., PUCCH or PUSCH). Each of the beams may have a different beam direction. The beam sweep pattern may or may not include the beam direction (e.g., beam 703) of the initial PDSCH transmission. In one example, one of the beams (e.g., the first beam 706) may have the same beam direction as the initial PDSCH transmission 702. The scheduling entity can perform beam measurements of the beams using various methods. In one example, the scheduling entity may measure the RSRP (reference signal received power) that represents the average received power of the reference signals. In another example, the scheduling entity may measure the received signal strength indicator (RSSI) that indicates the received power measured over the UL bandwidth of the beam. Based on the beam measurements, the scheduling entity selects the beam (e.g., beam with highest RSRP or RSSI) for retransmission of the DL data. In one example, the scheduling entity may configure the scheduled entity to use the selected beam for a retransmission (ReTx) by transmitting the configuration in a PDCCH 712 (e.g., DCI). Then, the scheduling entity retransmits the DL data in a PDSCH 714 using the selected beam (e.g., second beam 708). In this case, if the scheduled entity successfully receives and decodes the DL data, the scheduled entity transmits UL feedback (e.g., ACK) in a PUCCH 716 using the same beam (e.g., beam 708) as the PDSCH.

Figure 8:
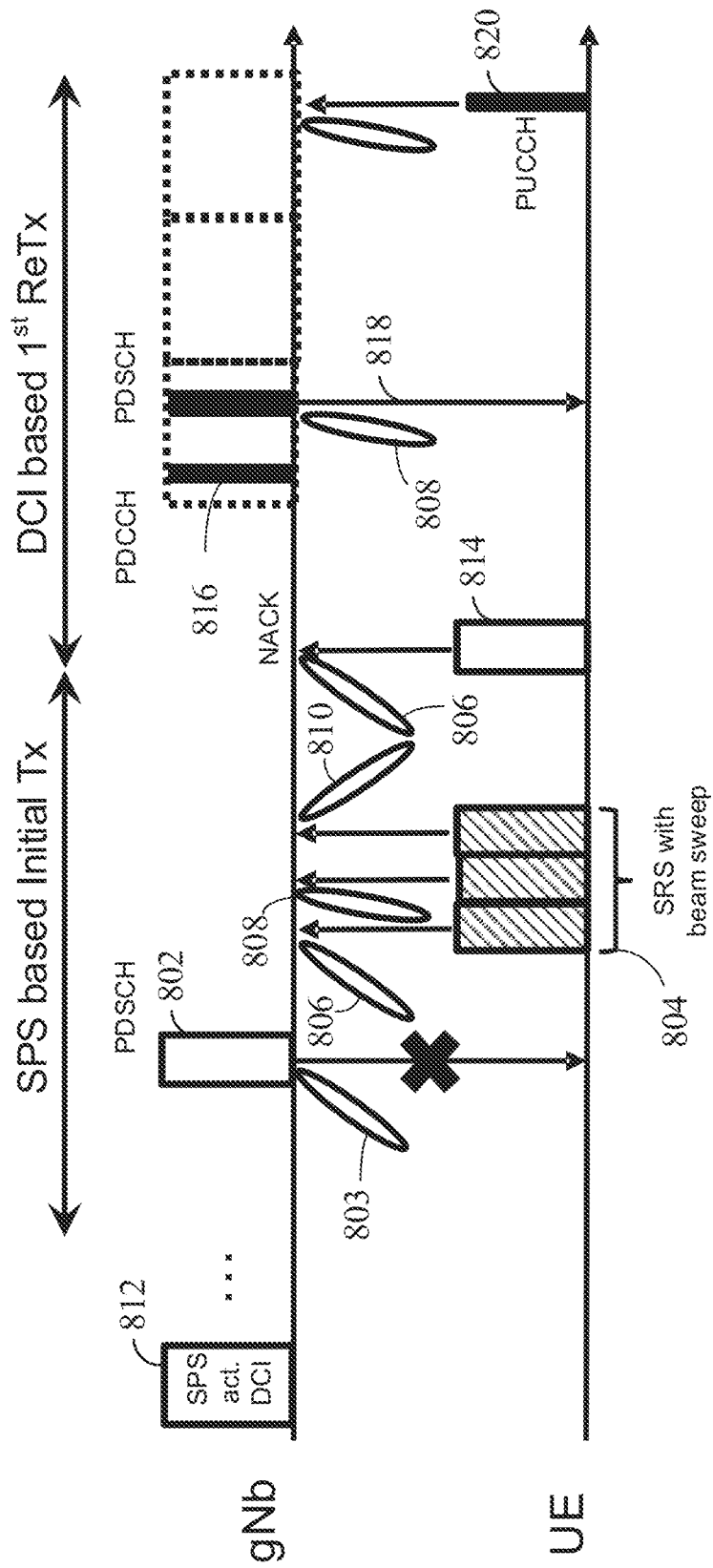
FIG. 8 a diagram conceptually illustrating another data retransmission process using fast beam selection based on a feedback beam sweep according to some aspects of the disclosure.

FIG. 8 is a diagram conceptually illustrating another data retransmission process using fast beam selection based on a feedback beam sweep in accordance with some aspects of the present disclosure. In some examples, the process may be carried out by a scheduling entity 500 (e.g., gNB) illustrated in FIG. 5 and a scheduled entity 600 (e.g., UE) illustrated in FIG. 6. In an SPS based initial transmission (Tx), the scheduling entity transmits DL data in a DL data channel (e.g., PDSCH 802) using certain SPS resources. When beamforming is configured for the DL transmission, the scheduling entity may transmit the DL data in a PDSCH 802 using one or more predetermined beams (e.g., beam 803). In some scenarios, the scheduled entity is unable to receive and/or decode the initial PDSCH 802. Due to the mobility and/or changing channel condition between the scheduling entity and scheduled entity, the beam used for the initial transmission of the PDSCH 802 may no longer be the best beam for communication between the scheduling entity and scheduled entity.

In one aspect, the scheduled entity may transmit one or more reference signals (e.g., SRS) using a beam sweep pattern 804 to facilitate fast beam selection at the scheduling entity. For example, in an exemplary beam sweep pattern, the scheduled entity transmits a first beam 806, a second beam 808, and a third beam 810 using UL resources allocated to SRS transmission. Each of the beams may have a different beam direction. The beam sweep pattern may or may not include the beam direction of the initial PDSCH transmission (e.g., beam 803). In one example, one of the beams (e.g., the first beam 806) may have the same beam direction as the initial PDSCH transmission 802.

In one aspect of the disclosure, the scheduling entity may dynamically control (i.e., enable and disable) the above-described reference signal beam sweep via an indicator including an activation command. The scheduling entity may transmit the indicator in an individual transmission separate from the reference signal beam sweep. In one example, the indicator may be an SPS activation DCI 812 configured to activate or enable the beam sweep pattern. In another example, the indicator may be an MAC-CE configured to activate or enable the beam sweep pattern. For example, the scheduling entity may dynamically control (enable or disable) the SRS beam sweep pattern per SPS Tx cycle, for example, enabled for the current SPS Tx cycle and/or next cycle. In one aspect of the disclosure, the scheduling entity may semi-statically control (e.g., using an RRC configuration) the reference signal beam sweep. The RRC configuration may include an indicator or activation command configured to enable the reference signal beam sweep. In some aspects of the disclosure, the SRS beam sweep resources may have the same or different period than the SPS Tx period. In one example, the SRS beam sweep resources may occur in every SPS Tx period. In another example, the SRS beam sweep resources may occur per a predetermined number of SPS Tx periods.

After transmitting the reference signal in the beam sweep pattern 804, the scheduled entity may transmit a HARQ feedback to the scheduling entity. For example, the feedback may be a NACK 814 transmitted in a PUCCH or PUSCH using the same beam 803 as the PDSCH 802. Depending on the channel condition, the scheduling entity may or may not receive the NACK 814. If the scheduling entity has received the NACK, the scheduling entity may retransmit the DL data (PDSCH) in a HARQ retransmission (e.g., DCI based $1^{st}$ ReTx in FIG. 8). Based on the UL measurements of the different beams carrying the reference signal, the scheduling entity can select the beam used for retransmission of the DL data 818.

The scheduling entity may perform beam measurements of the UL beams in various methods. In some aspects of the disclosure, the scheduling entity can determine one or more qualities of the beams. In one example, the scheduling entity may measure the RSRP (reference signal received power) that represents the average received power of the reference signals. In another example, the scheduling entity may measure the received signal strength indicator (RSSI) that indicates the received power measured over the UL bandwidth of the beam. Based on the beam measurements, the scheduling entity selects the beam (e.g., beam with highest RSRP or RSSI) for the retransmission of the DL data. In one example, the scheduling entity may configure the scheduled entity to use the selected beam by signaling the information in a PDCCH 816 (e.g., DCI). Then, the scheduling entity can retransmit the DL data in a PDSCH 818 using the selected beam (e.g., second beam 808). If the scheduled entity can successfully receive and decode the DL data, the scheduled entity transmits UL feedback (e.g., ACK) in an UL channel (e.g., PUCCH 820) using the same beam.

Figure 9:
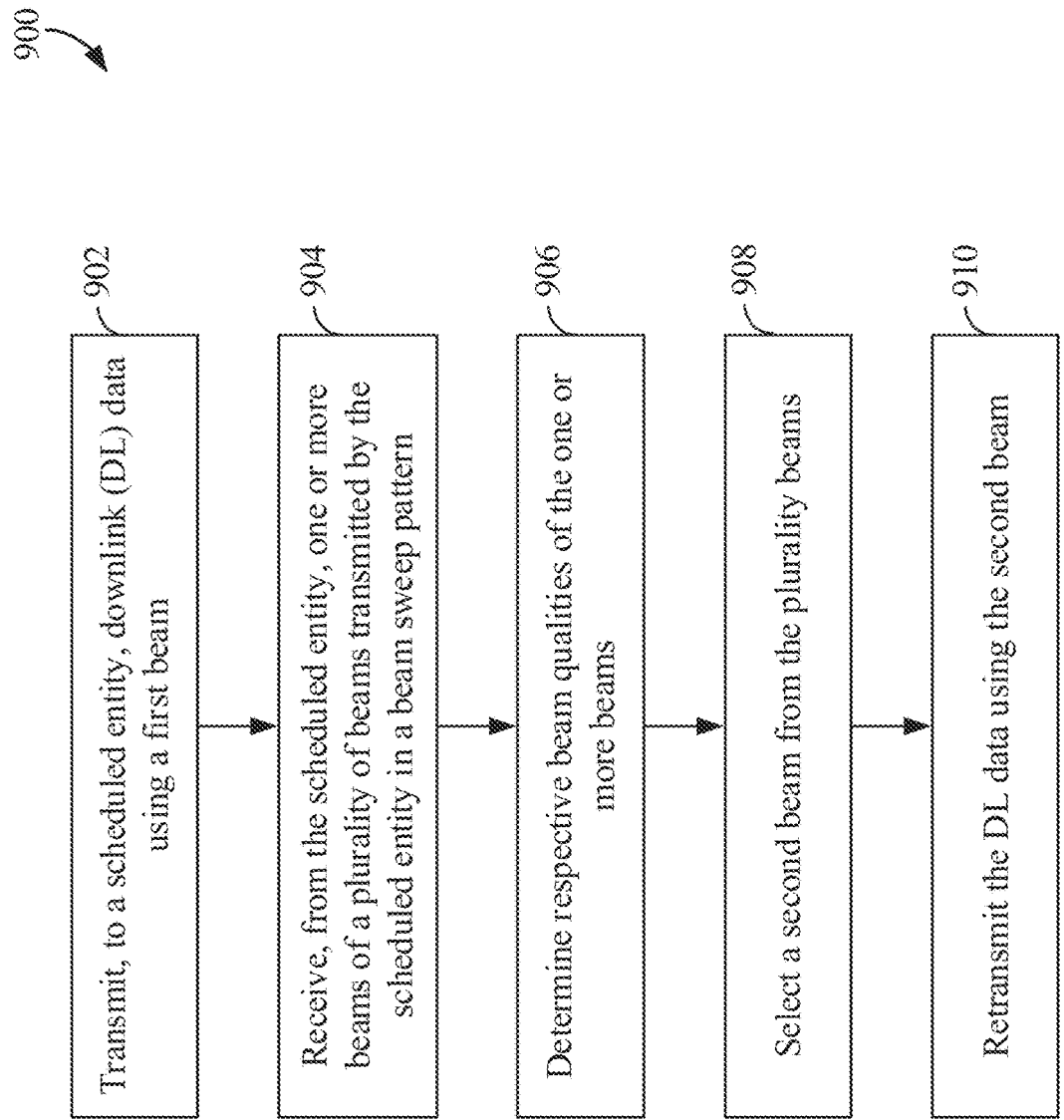
FIG. 9 is a flow chart illustrating an exemplary process for data retransmission at a scheduling entity using fast beam selection according to some aspects of the disclosure.

FIG. 9 is a flow chart illustrating an exemplary process 900 for data retransmission at a scheduling entity using fast beam selection in accordance with some aspects of the present disclosure. As described below, some or all illustrated features may be omitted in a particular implementation within the scope of the present disclosure, and some illustrated features may not be required for the implementation of all embodiments. In some examples, the process 900 may be carried out by the scheduling entity 500 illustrated in FIG. 5. In some examples, the process 900 may be carried out by any suitable apparatus or means for carrying out the functions or algorithm described below.

At block 902, a scheduling entity (e.g., gNB) transmits downlink (DL) data using a first beam to a scheduled entity (e.g., UE). For example, the scheduling entity may use the UL/DL communication circuit 542 in connection with the transceiver 510 and antenna array 520 to transmit the DL data in a DL data channel (e.g., PDSCH). The scheduling entity may use the beamforming circuit 544 to configure a predetermined beam for transmitting the DL data to the scheduled entity. In an example, the scheduling entity may determine the predetermined beam based on reference signals (e.g., SRS) from the scheduled entity.

At block 904, the scheduling entity receives one or more beams of a plurality of beams in a beam sweep pattern from the scheduled entity. As described above in relation to FIGS. 7 and 8, the scheduling entity may configure the scheduled entity to transmit a beam sweep pattern when the scheduled entity failed to receive the DL data. In one example, the scheduled entity may transmit a HARQ NACK of the DL data in the beam sweep pattern. In another example, the scheduled entity may transmit a reference signal (e.g., SRS) in the beam sweep pattern.

At block 906, the scheduling entity determines respective beam qualities of the one or more beams. For example, the scheduling entity may use the beamforming circuit 544 to determine the beam qualities (e.g., RSRP and/or RSSI). At block 908, the scheduling entity selects a second beam based on the respective beam qualities of the one or more beams received from the scheduled entity. For example, the scheduling entity may use the beamforming circuit 544 to select the second beam based on its beam quality.

Figure 10:
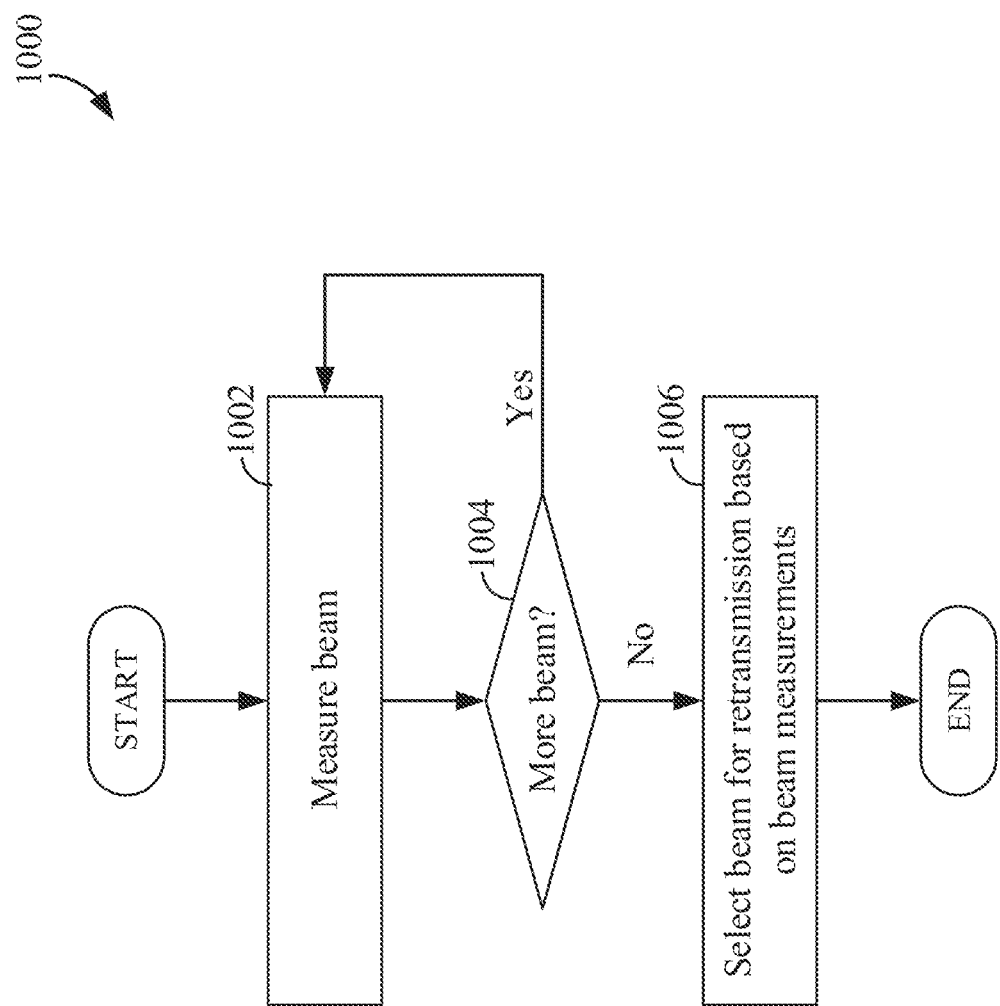
FIG. 10 is a diagram illustrating an exemplary process for selecting a beam from a beam sweep pattern according to some aspects of the disclosure.

FIG. 10 is a diagram illustrating an exemplary process 1000 for selecting a beam from a beam sweep pattern in accordance with some aspects of the present disclosure. In one aspect, the scheduling entity may use this process 1000 to select a beam at block 906 of FIG. 9. At block 1002, the scheduling entity measures a beam of the beam sweep pattern to determine its signal quality (e.g., RSRP and/or RSSI). For example, the scheduling entity may use the processing circuit 540 in connection with the beamforming circuit 544 to measure the quality of the beam. At decision block 1004, the scheduling entity determines if the beam sweep pattern has more beams for measurement. If there are more beam(s) to measure, the scheduling entity returns to block 1002 to measure another beam; otherwise, the scheduling entity proceeds to block 1006. At block 1006, the scheduling entity selects a beam among the measured beams for retransmitting DL data. The scheduling entity may select the beam based on the beam measurements of the beams. For example, the scheduling entity may select the beam with the best measured RSRP and/or RSSI. In some examples, the scheduling entity may select the beam using other signal quality measurements.

Referring back to FIG. 9, at block 910, the scheduling entity retransmits the DL data using the second beam selected in block 908. For example, the scheduling entity may use the UL/DL communication circuit 542 to retransmit the DL data via the transceiver 510 and antenna array 520 as a HARQ retransmission in a PDSCH using the selected beam (second beam).

Figure 11:
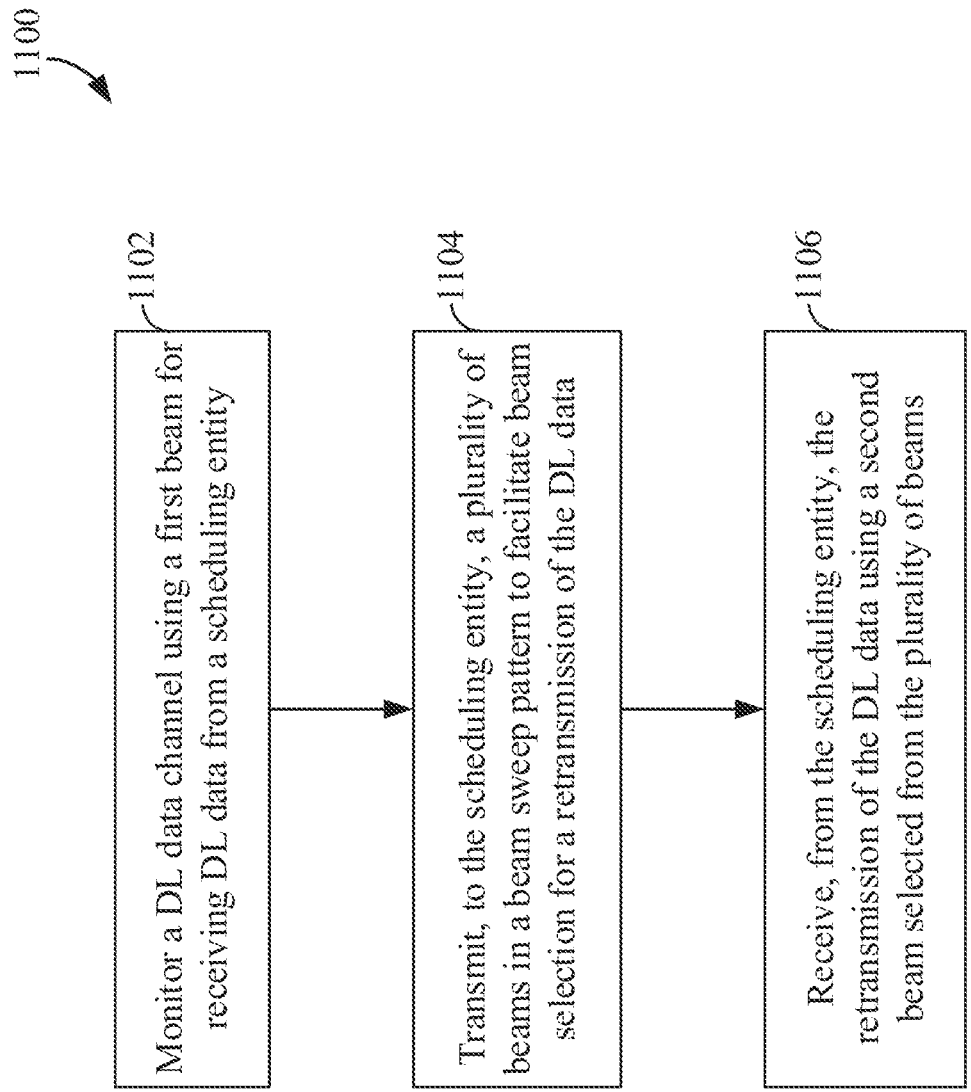
FIG. 11 is a flow chart illustrating another exemplary process for data retransmission at a scheduled entity using fast beam selection according to some aspects of the disclosure.

FIG. 11 is a flow chart illustrating another exemplary process 1100 for data retransmission at a scheduled entity using fast beam selection in accordance with some aspects of the present disclosure. As described below, some or all illustrated features may be omitted in a particular implementation within the scope of the present disclosure, and some illustrated features may not be required for the implementation of all embodiments. In some examples, the process 1100 may be carried out by the scheduled entity 600 illustrated in FIG. 6. In some examples, the process 1100 may be carried out by any suitable apparatus or means for carrying out the functions or algorithm described below.

At block 1102, the scheduled entity (e.g., UE) monitors a DL data channel using a first beam for receiving DL data from a scheduling entity (e.g., gNB or base station). For example, the scheduled entity may use the UL/DL communication circuit 644 to monitor a physical downlink shared channel (PDSCH) via the transceiver 610 and antenna array 620. The scheduling entity may transmit the DL data in one or more beams. However, in some scenarios, the scheduled entity may not be able to receive the DL data in the beam(s) used by the scheduling entity during the initial transmission (e.g., PDSCH 702 and 802) of the DL data.

At block 1104, the scheduled entity transmits a plurality of beams in a beam sweep pattern to facilitate fast beam selection for a retransmission of the DL data. For example, the scheduled entity may use the beamforming circuit 642 to determine the plurality of beams based on an SPS configuration (e.g., RRC configuration) and use the UL/DL communication circuit 644 to transmit a beam sweep pattern including the plurality of beams via the transceiver 610 and antenna array 620. In some examples, the plurality of beams may include the NACK of the DL data similar to the NACK 704 described above in relation to FIG. 7. In some examples, the plurality of beams may include a reference signal (e.g., SRS) similar to the SRS in the beam sweep pattern 804 described above in relation to FIG. 8.

At block 1106, the scheduled entity receives a retransmission of the DL data using a second beam of the plurality of beams. The scheduling entity may select the second beam based on the respective qualities of the plurality of beams. In one example, the scheduled entity may use the UL/DL communication circuit 644 to receive the DL data via the transceiver 610 and antenna array 620. The DL data retransmission may be a PDSCH received in a beam that has better signal quality (e.g., higher RSRP and/or RSSI) among the plurality of beams.

In one configuration, the apparatus 500 for wireless communication includes means for transmitting downlink (DL) data using a first beam, means for receiving one or more beams of a plurality of beams transmitted by a scheduled entity in a beam sweep pattern, means for determining respective beam qualities of the one or more beams, means for selecting a second beam based on the respective beam qualities of the one or more beams, and means for retransmitting the DL data using the second beam. In one aspect, the aforementioned means may be the processor 504 shown in FIG. 5 configured to perform the functions recited by the aforementioned means. In another aspect, the aforementioned means may be a circuit or any apparatus configured to perform the functions recited by the aforementioned means.

In one configuration, the apparatus 600 for wireless communication includes means for monitoring a downlink (DL) data channel using a first beam for receiving DL data from a scheduling entity, means for transmitting a plurality of beams in a beam sweep pattern to facilitate beam selection for a retransmission of the DL data, and means for receiving the retransmission of the DL data using a second beam of the plurality of beams. In one aspect, the aforementioned means may be the processor 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 504/604 is merely provided as an example, and other means for carrying out the described functions may be included within various aspects of the present disclosure, including but not limited to the instructions stored in the computer-readable storage medium 506/606, or any other suitable apparatus or means described in any one of the FIGS. 1, 2, and/or 3, and utilizing, for example, the processes and/or algorithms described herein in relation to FIGS. 7-11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 5, and 6 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduling entity, comprising:
　　transmitting, to a user equipment (UE), downlink (DL) data using a first beam;

receiving one or more beams of a plurality of beams transmitted by the UE in a beam sweep pattern configured to facilitate beam selection for a retransmission of the DL data;

determining respective beam qualities of the one or more beams;

selecting a second beam based on the respective beam qualities of the one or more beams; and retransmitting the DL data using the second beam.

2. The method of claim 1, wherein receiving the one or more beams comprises:

receiving at least one of a negative acknowledgment (NACK) of the DL data or a plurality of reference signals, from the beam sweep pattern configured to facilitate beam selection for a retransmission of the DL data.

3. The method of claim 1, wherein determining the respective beam qualities comprises:

measuring the one or more beams to determine at least one of reference signal received power (RSRP) or received signal strength indicator (RSSI) of each beam.

4. The method of claim 1, further comprising:

transmitting, to the UE, an indicator configured to enable semi-persistent scheduling of the beam sweep pattern.

5. The method of claim 4, further comprising:

transmitting a downlink control information (DCI) or MAC control element (MAC-CE) to activate the beam sweep pattern.

6. The method of claim 4, wherein transmitting the indicator comprises:

transmitting a radio resource control (RRC) configuration including the indicator configured to enable the semi-persistent scheduling of the beam sweep pattern.

7. The method of claim 4, wherein transmitting the indicator comprises:

transmitting the indicator in an individual transmission that is temporally separated from the beam sweep pattern.

8. The method of claim 7, wherein the indicator is configured to enable the beam sweep pattern only in a semi-persistent scheduling (SPS) cycle including the individual transmission and the beam sweep pattern, or wherein the indicator is configured to enable the beam sweep pattern in a first SPS cycle including the individual transmission and the beam sweep pattern, and a second SPS cycle following the first SPS cycle.

9. A method of wireless communication at a user equipment (UE), comprising:

monitoring a downlink (DL) data channel using a first beam for receiving DL data from a scheduling entity;

transmitting, to the scheduling entity, a plurality of beams in a beam sweep pattern to facilitate beam selection for a retransmission of the DL data; and receiving, from the scheduling entity, the retransmission of the DL data using a second beam of the plurality of beams.

10. The method of claim 9, wherein transmitting the plurality of beams comprises:

transmitting at least one of a negative acknowledgment (NACK) of the DL data or a plurality of reference signals, in the beam sweep pattern.

11. The method of claim 9, further comprising:

receiving, from the scheduling entity, an indicator configured to enable semi-persistent scheduling of the beam sweep pattern.

12. The method of claim 11, further comprising:

receiving a downlink control information (DCI) or a medium access control (MAC) control element, to activate the beam sweep pattern.

13. The method of claim 11, wherein receiving the indicator comprises:

receiving a radio resource control (RRC) configuration including the indicator configured to enable the semi-persistent scheduling of the beam sweep pattern.

14. The method of claim 11, wherein receiving the indicator comprises:

receiving the indicator in an individual transmission that is temporally separated from the beam sweep pattern.

15. The method of claim 14, wherein the indicator is configured to enable the beam sweep pattern only in a semi-persistent scheduling (SPS) cycle including the individual transmission and the beam sweep pattern; or wherein the indicator is configured to enable the beam sweep pattern in a first SPS cycle including the individual transmission and the beam sweep pattern, and a second SPS cycle following the first SPS cycle.

16. A scheduling entity for wireless communication, comprising:

a communication interface configured to communicate with a user equipment (UE);

a memory; and a processor operatively coupled with the communication interface and the memory, wherein the processor and the memory are configured to:

transmit, to the UE, downlink (DL) data using a first beam;

receive, from the UE, one or more beams transmitted by the UE in a beam sweep pattern configured to facilitate beam selection for a retransmission of the DL data;

determine respective beam qualities of the one or more beams;

select a second beam based on the respective beam qualities of the one or more beams; and retransmit the DL data using the second beam.

17. The scheduling entity of claim 16, wherein the processor and the memory are further configured to receive at least one of a negative acknowledgment (NACK) of the DL data or a plurality of reference signals, from the beam sweep pattern configured to facilitate beam selection for a retransmission of the DL data.

18. The scheduling entity of claim 16, wherein the processor and the memory are further configured to determine the respective beam qualities by:

measuring the one or more beams to determine at least one of reference signal received power (RSRP) or received signal strength indicator (RSSI) of each beam.

19. The scheduling entity of claim 16, wherein the processor and the memory are further configured to:

transmit, to the UE, an indicator configured to enable semi-persistent scheduling of the beam sweep pattern.

20. The scheduling entity of claim 19, wherein the processor and the memory are further configured to transmit a downlink control information (DCI) or MAC control element (MAC-CE) to activate the beam sweep pattern.

21. The scheduling entity of claim 19, wherein the processor and the memory are further configured to transmit a radio resource control (RRC) configuration including the indicator configured to enable the semi-persistent scheduling of the beam sweep pattern.

22. The scheduling entity of claim 19, wherein the processor and the memory are further configured to transmit the indicator in an individual transmission that is temporally separated from the beam sweep pattern.

23. The scheduling entity of claim 22,
wherein the indicator is configured to enable the beam sweep pattern only in a semi-persistent scheduling (SPS) including the individual transmission and the beam sweep pattern, or
wherein the indicator is configured to enable the beam sweep pattern in a first SPS cycle including the individual transmission and the beam sweep pattern, and a second SPS cycle following the first SPS cycle.

24. A user equipment (UE) for wireless communication, comprising:
a communication interface configured to communicate with a scheduling entity;
a memory; and
a processor operatively coupled to the communication interface and the memory,
wherein the processor and the memory are configured to:
monitor a downlink (DL) data channel using a first beam for receiving DL data from the scheduling entity;
transmit, to the scheduling entity, a plurality of beams in a beam sweep pattern to facilitate beam selection for a retransmission of the DL data; and
receive, from the scheduling entity, the retransmission of the DL data using a second beam selected from the plurality of beams.

25. The UE of claim 24, wherein the processor and the memory are further configured to transmit at least one of a negative acknowledgment (NACK) of the DL data or a plurality of reference signals, in the beam sweep pattern.

26. The UE of claim 24, wherein the processor and the memory are further configured to:
receive, from the scheduling entity, an indicator configured to enable semi-persistent scheduling of the beam sweep pattern.

27. The UE of claim 26, wherein the processor and the memory are further configured to receive a downlink control information (DCI) or a medium access control (MAC) control element, to activate the beam sweep pattern.

28. The UE of claim 26, wherein the processor and the memory are further configured to receive a radio resource control (RRC) configuration including the indicator configured to enable the semi-persistent scheduling of the beam sweep pattern.

29. The UE of claim 26, wherein the processor and the memory are further configured to receive the indicator in an individual transmission that is temporally separated from the beam sweep pattern.

30. The UE of claim 29,
wherein the indicator is configured to enable the beam sweep pattern only in a semi-persistent scheduling (SPS) cycle including the individual transmission and the beam sweep pattern, or
wherein the indicator is configured to enable the beam sweep pattern in a first SPS cycle including the individual transmission and the beam sweep pattern, and a second SPS cycle following the first SPS cycle.

* * * * *